United States Patent [19]

Fu

[11] Patent Number: 4,663,025
[45] Date of Patent: May 5, 1987

[54] CATALYTIC CRACKING PROCESSES

[75] Inventor: Chia-Min Fu, Bartlesville, Okla.

[73] Assignee: Phillips Petroleum Company, Bartlesville, Okla.

[21] Appl. No.: 896,490

[22] Filed: Aug. 14, 1986

[51] Int. Cl.$^4$ ............................................. C10G 11/05
[52] U.S. Cl. ........................................ 208/120; 502/79
[58] Field of Search .......................... 208/120; 502/79

[56] References Cited

U.S. PATENT DOCUMENTS

| | | | |
|---|---|---|---|
| 3,293,192 | 12/1966 | Maher et al. | 502/62 |
| 3,392,124 | 7/1968 | Laurent | 252/459 |
| 3,493,519 | 2/1970 | Kerr et al. | 252/455 |
| 3,506,400 | 5/1966 | Eberly et al. | 23/182 |
| 3,591,488 | 7/1971 | Eberly et al. | 208/111 |
| 3,702,886 | 11/1972 | Argauer et al. | 423/328 |
| 3,761,396 | 9/1973 | Pickert | 208/111 |
| 4,218,307 | 8/1980 | McDaniel | 208/120 |
| 4,259,212 | 3/1981 | Gladrow et al. | 502/79 |
| 4,269,695 | 5/1981 | Silk et al. | 208/111 |
| 4,326,994 | 4/1982 | Haag et al. | 252/455 Z |
| 4,357,265 | 11/1982 | Chiang | 502/79 |
| 4,382,023 | 5/1983 | Mulaskey | 502/79 |
| 4,394,362 | 7/1983 | Miller | 423/328 |
| 4,430,200 | 2/1984 | Shihabi | 208/120 |
| 4,437,975 | 3/1984 | Gillespie et al. | 208/87 |
| 4,443,552 | 4/1984 | Iida et al. | 502/66 |
| 4,443,554 | 4/1984 | Dessau | 502/71 |
| 4,447,669 | 5/1984 | Hamon et al. | 585/640 |
| 4,456,780 | 6/1984 | Young | 584/475 |
| 4,465,884 | 8/1984 | Degnan et al. | 585/407 |
| 4,477,336 | 10/1984 | Scherzer | 502/67 |
| 4,512,961 | 4/1985 | Scherzer et al. | 502/79 |
| 4,576,709 | 3/1986 | Miller et al. | 208/120 |
| 4,587,115 | 5/1986 | Arika et al. | 502/79 |
| 4,588,496 | 5/1986 | Scherzer | 502/79 |
| 4,606,813 | 8/1986 | Byrne et al. | 208/120 |

OTHER PUBLICATIONS

Linde Molecular Sieves-Zeolite Catalyst Data, LZ-Y82; Union Carbide, 3/78.
"Zeolite Molecular Sieves", by Donald W. Breck, 1974, John Wiley & Sons, Inc., p. 145.
ASTM D 3942-80, Standard Method for Determination of the Unit Cell Dimension of a Faujasite-Type Zeolite.
"Petrtoleum Refining", by James H. Gary and Glenn E. Handwerk, 1975, Marcel Dekkes, Inc., pp. 86-89 and 111.

Primary Examiner—Andrew H. Metz
Assistant Examiner—Anthony McFarlane
Attorney, Agent, or Firm—K. K. Brandes

[57] ABSTRACT

Hydrocarbon-containing feed streams (preferably heavy gas oils and hydrotreated residua) having an initial boiling point of at least 400° F. are catalytically cracked in the presence of a cracking catalyst comprising a faujasite-type zeolite having a unit cell size of about 24.28-24.48 Å and an an alkali metal content of less than about 0.5 weight percent and being substantially free of iron ions. Preferably, the faujasite-type zeolite has an atomic Si:Al ratio in the crystalline framework of about 8:1 to 21:1 and has been partially dealuminated by a process comprising steam treatment followed by acid leaching.

21 Claims, 1 Drawing Figure

CATALYTIC CRACKING PROCESSES

BACKGROUND AND SUMMARY OF THE INVENTION

In one aspect, this invention relates to a process for cracking hydrocarbon-containing feed streams employing catalysts which contain faujacite-type zeolite. In another aspect, this invention relates to a process for cracking gas oils, recycle oils, residua, hydrotreated residua, and the like. In still another aspect, this invention relates to the use of cracking catalysts containing faujacite-type zeolites that have been partially dealuminated. Other objects and advantages will be apparent from the detailed description, drawing and appended claims.

In accordance with this invention, a hydrocarbon-containing feed stream having an initial boiling point (determined according to ASTM D 1160) of at least about 400° F. is contacted with a catalyst composition comprising a faujacite-type zeolite having a unit cell size (unit cell dimension; determined in accordance with ASTM D 3942-80) in the range of from about 24.28 to about 24.48 angstroms and an alkali metal content of less than 0.5 weight percent and being substantially free of iron ions (i.e., containing less than about 0.05 weight-% Fe), under such cracking conditions as to obtain at least one normally liquid (i.e., liquid at 25° C., 1 atm) hydrocarbon-containing product stream having a lower initial boiling point and higher $API_{60}$ gravity than said hydrocarbon-containing feed stream.

In a preferred embodiment of this invention, the unit cell size of the faujasite-type zeolite contained in the cracking catalyst composition is in the range of from about 24.31 to about 24.42 angstroms, and the atomic silicon-aluminum ratio in the crystalline framework of said faujasite-type zeolite is in the range of from about 8:1 to about 21:1 (determined by $^{29}Si$ solid state nuclear magnetic resonance spectrometry). Preferably, the content of alkali metal (in particular Na) in the faujasite-type zeolite is less than about 0.2 weight percent, and the content of Fe is less than about 0.01 weight percent. Preferred faujasite-type zeolites are Y-zeolites which have been partially dealuminated. Preferred hydrocarbon-containing feed streams comprise gas oils, cracker recycle oils, residua and hydrotreated residua and have preferably a boiling range (ASTM D 1160) of from about 400° to about 1200° F.

DETAILED DESCRIPTION OF THE INVENTION

Figure 1:
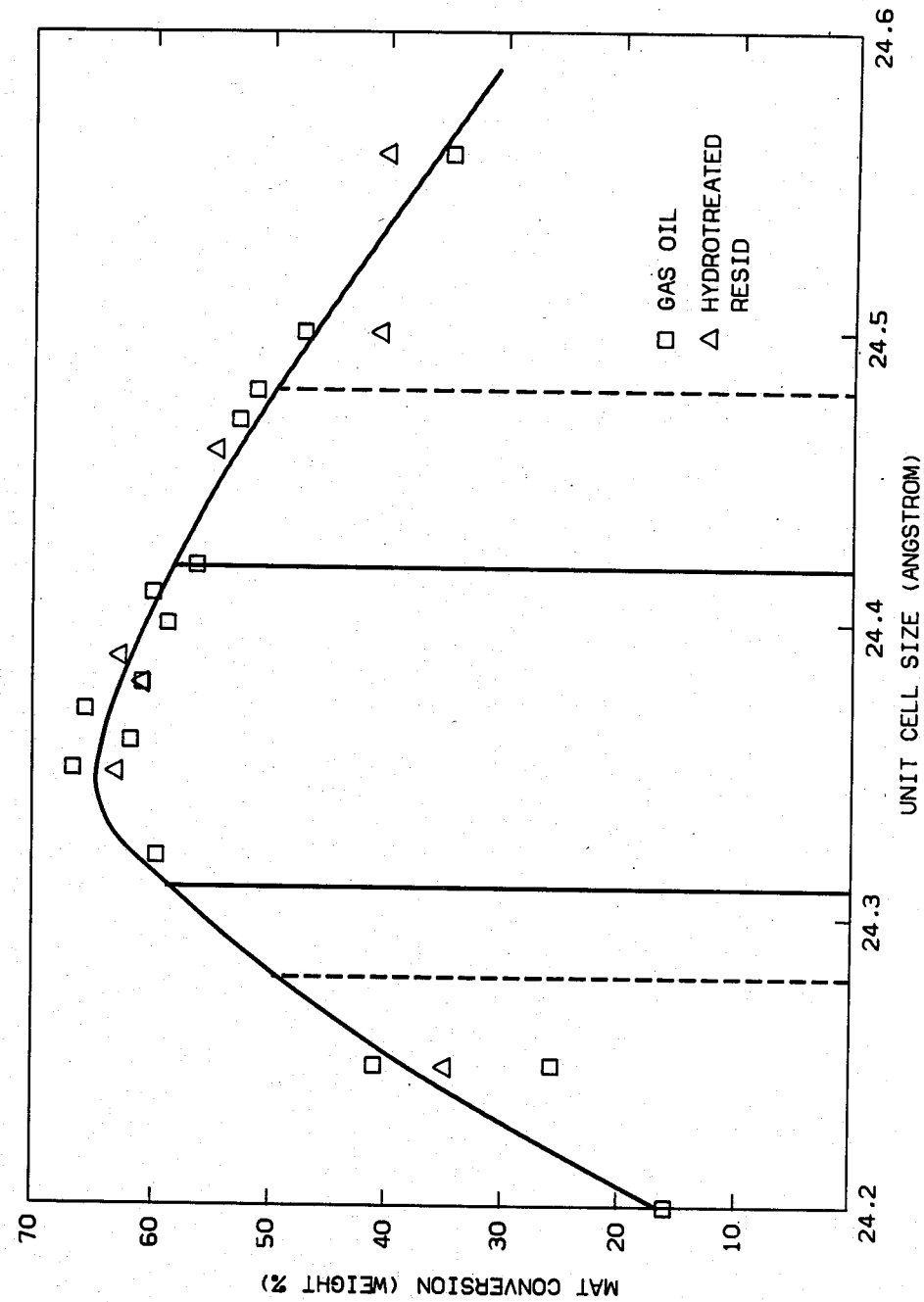
FIG. 1 shows the correlation between MAT conversion of gas oil and hydrotreated resid and the unit cell size of faujasite-type zeolites.

The hydrocarbon-containing feed stream for the process of this invention can be any feedstock having an initial boiling point (ASTM D 1160) in excess of about 400° F., preferably boiling in the range of from about 400° to about 1200° F., more preferably in the range of from about 500° to about 1100° F. The $API_{60}$ gravity (measured at 60° F.) generally is in the range of from about 5 to about 40, preferably from about 10 to about 35. Frequently these feedstocks contain Ramsbottom carbon residue (ASTM D 524; generally about 0.1–20 weight-%), sulfur (generally about 0.1–5 weight-%), nitrogen (generally about 0.05–2 weight-%), nickel (generally about 0.05–30 parts by weight per millions parts, abbreviated ppm) and vanadium (generally about 0.1–50 ppm). Non-limiting examples of suitable feedstocks are light gas oils, heavy gas oils, vacuum gas oils, cracker recycle oils (cycle oils), topped crudes, residua (distillation bottoms fractions), hydrotreated topped crudes and hydrotreated residua (e.g., hydrotreated in the presence of Ni, Co, Mo-promoted alumina catalysts), coal pyrolyzates, products from extraction of coal, products from liquifaction of coal, products from extraction and pyrolysis of tar sand, shale oils, heavy fractions of shale oils, and the like. Presently most preferred feedstocks are heavy gas oils and hydrotreated residua.

The faujasite-type zeolite contained in the cracking catalyst employed in the process of this invention include natural mordenite and natural faujasite from which a portion of the aluminum has been removed from the crystalline framework, as well as synthetic mordenites such as Zeolon and synthetic faujasites such as X- and Y-zeolites (also referred to as zeolite X and zeolite Y), from which a portion of Al has been removed from the crystalline framework. The constraint index as defined in U.S. Pat. No. 4,269,695, herein incorporated by reference, of the faujasite-type zeolite is about 0.35–0.45, preferably about 0.4.

Controlled partial removal of Al from the framework of a natural or synthetic faujasite-type zeolite, hereinafter referred to as partial dealuminating, results in a decrease of the unit cell dimension of the faujasite-type zeolite (generally from about 24.5–24.6 A in the starting material to the required unit cell size of about 24.28–24.48 A, preferably about 24.31–24.42 A), and also in a higher Si:Al atomic ratio in the crystalline zeolite framework (generally from about 2.7:1 in the starting zeolite material to the preferred range of about 8:1–21:1)

Generally, the alkali metal content and the iron content in the faujasite-type zeolite starting material (which is to undergo controlled dealumination) are already as low as required for the cracking process of this invention, and no further reduction in alkali metal and iron content is needed. If, however, the alkali metal content and the iron content of the faujasite-type zeolite starting material exceed the levels that can be tolerated in the cracking process of this invention, a partial dealuminating method must be employed that removes a portion of alkali metal and iron ions, e.g., a method comprising extraction with aqueous acid, such as the preferred dealuminating method described below. As has been shown in Example VI, an excessive alkali metal content in the partially dealuminated faujasite-type zeolite has a detrimental effect on the cracking activity of the zeolite. It is believed that iron in excess of about 0.05 weight percent also adversely affects the cracking performance of the partially dealuminated faujasite-type zeolite.

The partially dealuminated faujasite-type zeolites can be used "as is", or they can be physically admixed with at least one inorganic refractory material such as silica, alumina, silica-alumina, clay and the like, or they can be embedded in a binder matrix of at least one inorganic refractory material such as silica, alumina, silica-alumina, clay and the like. Generally, the weight ratio of zeolite to such inorganic refractory materials in the cracking catalyst is in the range of from about 1:20 to about 1:1.

Preferably a Y-zeolite, more preferably an ultrastable LZY zeolite marketed by Union Carbide Corporation, is partially dealuminated so as to attain the crystalline unit cell size and atomic Si:Al ratio of the crystalline framework, $(Si/Al)_c$, required for the cracking process of this invention. The surface area (determined by the BET/$N_2$ method; without binder) of the faujasite-type zeolite employed in the process of this invention, preferably partially dealuminated Y-zeolite, generally ranges from about 500 to about 1000 $m^2/g$, preferably from about 600 to about 800 $m^2/g$.

Any suitable method of partial dealuminating (i.e., removing a portion of aluminum from the crystalline framework) faujasite-type zeolites can be employed, such as those listed in U.S. Pat. No. 4,430,200, herein incorporated by reference. A presently preferred method of partially dealuminating faujasite-type zeolites is by exposure to steam, such as at a temperature of about 1200°–1600° F. for about 0.2–20 hours. A more preferred dealuminating method resulting in a desired unit cell size and desirably high surface area of the zeolite includes steam-treatment at about 1300°–1500° F. for about 0.5–5 hours, followed by acid extraction with a acid such as aqueous HCl having a normality of from about $10^{-3}$ to about 5 equivalents per liter, at a temperature of about 180°–210° F. for about 1–4 hours. The thus treated zeolite is generally thoroughly washed with deionized water, dried and calcined (preferably at about 500°–600° C., for about 1–10 hours). More details are presented in Example II.

Any suitable reactor can be used for the catalytic cracking process of this invention. Generally a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in earlier cited U.S. Pat. Nos. 4,377,470 and 4,424,116. Generally a catalyst regeneration unit (for removal of coke deposits) is combined with the FCC cracking unit as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst to oil feed (i.e., hydrocarbon-containing feed) ratio ranges from about 2:1 to about 10:1, the contact time between oil feed and catalyst is in the range of about 0.2 to about 2.0 seconds, and the cracking temperature is in the range of from about 800° to about 1200° F. Generally steam is added with the oil feed to the FCC reactor so as to aid in the dispersion of the oil as droplets. Generally the weight ratio of steam to oil feed is in the range of from about 0.05:1 to about 0.5:1.

The separation of spent (i.e., used) cracking catalyst from gaseous and liquid cracked products and the separation into various gaseous and liquid product fractions can be carried out by any conventional separation means. The most desirable product fraction is gasoline (ASTM boiling range: about 180°–400° F.). Non-limiting examples of such separation schemes are shown in "Petroleum Refining" by James H. Gary and Glenn E. Handwerk, Marcel Dekker, Inc., 1975.

Generally the surface area (BET/$N_2$ method) of cracking catalysts (zeolite plus amorphous silica-alumina binder matrix) is in the range of from about 50 to about 200 $m^2/g$, and the pore volume generally ranges from about 0.2 to about 1.0 cc/g. Since generally cracking catalysts are regenerated (preferably by steam stripping for removal of adhered oil and subsequent oxidation so as to burn off carbon deposits) and then recycled (with or without added fresh catalysts) to the cracking reactor, these recycled catalyst (called equilibrium catalysts) generally contain small amounts of metal (Ni, V) deposited from heavy oil feeds.

The following examples are presented to further illustrate the invention and are not to be considered unduly limiting the scope of this invention.

EXAMPLE I

In this example the experimental methods for determining pertinent structural parameters of cracking catalyst which, contain faujasite-type zeolites, are described.

The unit cell dimension (also referred to as unit cell size; measured in angstroms) of the crystalline, faujasite (zeolite) framework portion of cracking catalysts (untreated or partially dealuminated) was determined by X-ray diffraction, essentially in accordance with ASTM D 3942-80.

The ratio of Si atoms to Al atoms in the crystalline zeolite framework portion of cracking catalysts was determined by $^{29}Si$ solid state NMR spectrometry, substantially in accordance with the procedure described by J. Klinowski et al. in Nature, April 1982, Volume 296, pages 533–536. The Si:Al atomic ratio in the crystalline framework portion is hereinafter referred to as $(Si/Al)_c$.

Since zeolite-type cracking catalysts generally also contain a substantially amorphous silica-alumina portion besides the crystalline zeolite portion, the atomic ratio of Si:Al of the entire (total) catalyst composition (referred to as $(Si/Al)_t$), is different from the $(Si/Al)_c$ ratio. The total Si content and the total Al content of faujasite-containing cracking catalyst (i.e., crystalline framework plus non-crystalline extra-framework portion) were determined by X-ray fluorescence spectrometry employing a Siemens MRS 400 multi-channel spectrometer.

The surface area of cracking catalyst was determined in accordance with a modified BET/$N_2$ method (ASTM D 3037), wherein the relative partial pressure of the gas phase, $p/p_o$, was in the range of about 0.01–0.06 ($p = N_2$ partial pressure in the gas phase, at the test conditions; $p_o =$ vapor pressure of $N_2$ at its boiling point under the test conditions).

The sodium content of the faujasite-containing cracking catalysts was determined by inductively-coupled plasma emission spectrometry.

EXAMPLE II

This example illustrates the experimental procedure for partially dealuminating faujasite-type zeolite catalysts. The starting material was an "ultrastable" ammonium-exchanged faujasite-type Y zeolite powder, marketed by Union Carbide Corporation, Danbury, CT under the product designation of Molecular Sieve LZ-Y82 had a BET/$N_2$ surface area of 770 $m^2/g$, a unit cell size of 24.56 A(angstroms), total $SiO_2$ content of 72.2 weight-%, total $Al_2O_3$ content of 22.8 weight-%, total $Na_2O$ content of 0.2 weight-% and total $(NH_4)_2O$ content of 4.0 weight-%. The $(Si/Al)_c$ atomic ratio of the crystalline framework was 5.3, the total (bulk) $(Si/Al)_t$ atomic ratio was 2.7. Three methods of dealuminating the LZ-Y82 faujasite-type zeolite were employed.

Method A (Not Preferred)

Samples of the starting material, LZ-Y82, were treated at about 90°–100° C. with hydrochloric acid having a pH in the range of 1.5 to 4, for a period of about 0.5–2 hour with stirring. The mixture of zeolite and HCl solution was then allowed to cool and was filtered. The filter cake was thoroughly washed with deionozed water, dried overnight at about 120°–200° C. and calcined at about 610° C. for about 3 hours. Evaluation of the thus treated zeolite samples indicated that at a pH of 3–4 of the HCl solution essentially no dealumination occurred (essentially no reduction in unit cell dimension and thus essentially no increase in $(Si/Al)_c$ ratio was detected); whereas at a pH of 1.5–2 the unit cell dimension did noticably decrease from about 24.56 of the starting material to about 24.36 angstroms, but also a substantial reduction in surface area resulted (from 770 m$^2$/g of the starting material to about 200–500 m$^2$/g after acid treatment). The substantial decrease in surface area indicated that a substantial portion of the zeolite (faujasite) framework was destroyed by the heat-treatment at a pH of 1.5–2. This destruction of a substantial portion of the zeolite portion of the cracking catalyst would obviously have a detrimental effect on the cracking activity. Therefore, Method A is not a preferred dealumination method.

Method B

The starting material, LZ-Y82, was subjected to steam at atmospheric pressure. Pertinent test conditions and results are summarized in Table I.

TABLE I

| Steam-Treatment | | Properties of Faujasite | | |
|---|---|---|---|---|
| Temp. (°F.) | Time (Hours) | Surface Area (m$^2$/g) | Unit Cell Size (A) | $(Si/Al)_c$ |
| —[1] | —[1] | 770 | 24.56 | 5.3 |
| 1340 | 1 | 745 | 24.42 | 7.7 |
| 1340 | 2 | 677 | 24.42 | — |
| 1340 | 4 | 668 | 24.42 | — |
| 1340 | 8 | 643 | 24.40 | — |
| 1340 | 16 | 619 | 24.41 | 11.5 |
| 1330 | 3 | 649 | 24.45 | — |
| 1400 | 3 | 651 | 24.39 | — |
| 1500 | 3 | 605 | 24.35 | — |

[1]starting material.

Data in Table I show that treatment of the faujasite-type zeolite with steam resulted in a noticeable reduction in unit cell size and in a noticeable increase in $(Si/Al)_c$ ratio (i.e., the atomic ratio fo Si to Al in the crystalline framework). However, prolonged steaming at 1340°–1500° F. did not reduce the unit cell size below 24.35 angstroms and also resulted in an undesirably high reduction in surface area (about 20% reduction). The total $(Si/Al)_t$ atomic ratio (as defined in Example I) was about 2.9 of the steam-treated faujasite (vs. 2.7 for the untreated LZ-Y82 faujasite). Thus, even though Method B is a feasible dealuminzation method, it has some limitations and is presently considered a less preferred method.

Method C (preferred)

This dealumination method is a combination of Method B and method A, steam-treatment at 1400°–1500° F. for 2–3 hours, followed by acid extraction of the steam-treated faujasite material with an aqueous HCl solution at about 90° C. (194° F.), for about 2–2.5 hours, washing, drying and calcination (see Method A). Pertinent test conditions and results are summarized in Table II.

TABLE II

| Steam Treatment | | Normality | Properties of Faujasite | | | |
|---|---|---|---|---|---|---|
| Temp. (°F.) | Time (Hours) | of Acid | Surface Area (m$^2$/g) | Unit Cell Size (A) | $(Si/Al)_c$ | $(Si/Al)_t$ |
| — | — | — | 770 | 24.56 | 5.3 | 2.7 |
| 1400 | 2 | 0.001 | 741 | 24.42 | — | — |
| 1400 | 2 | 0.01 | 700 | 24.41 | — | — |
| 1400 | 3 | 0.01 | 663 | 24.42 | (22.0)[2] | 3.0 |
| 1400 | 2 | 0.1 | 745 | 24.40 | — | — |
| 1400 | 3 | 0.1 | 742 | 24.36 | 21.2 | 4.6 |
| 1400 | 3 | 0.5 | 728 | 24.38 | 17.5 | 4.8 |
| 1400 | 3 | 1.0 | 782 | 24.32 | 21.2 | 4.6 |
| 1400 | 3 | 2.0 | 790 | 24.20 | 68.8 | 23.6 |
| 1500 | 3 | 0.01 | 666 | 24.37 | — | — |
| 1500 | 3 | 0.1 | 739 | 24.38 | — | — |
| 1500 | 3 | 0.5 | 719 | 24.37 | — | — |
| 1500 | 3 | 1.0 | 777 | 24.35 | — | — |
| 1500 | 3 | 2.0 | 633 | 24.25 | 100 | 20.7 |

[1]untreated starting material.
[2]considered to be erroneous; should be about 8, as indicated by data in Table I.

Data in Table II clearly show:

(a) the unit cell size could be reduced from about 24.56 A to a low value of about 24.20 A;

(b) the atomic ratio of the crystalline portion, $(Si/Al)_c$, could be reduced from about 5.3 to as low as about 100;

(c) the surface area was generally not significantly affected by treatment Method C;

(d) the total atomic ratio of Si to Al (for crystalline framework plus non-crystalline portion), $(Si/Al)_t$, was also increased, indicating leaching of Al from the faujasite-type zeolite.

Method C is the preferred method of dealuminating since it affords substantial reduction in unit cell size and substantial increase in $(Si/Al)_c$ ratio, at an acceptably low effect on surface area. It is believed that stream treatment (the first step) stabilizes the zeolite so that the subsequent acid treatment is effective in removing Al from the crystalline framework without destroying it.

EXAMPLE III

This control example illustrates tests for cracking n-hexane employing faujasite-type zeolites described in Example II. A mixture of vaporized n-hexane and nitrogen (volume ratio of $C_6H_{14}$ to $N_2$: about 1:4) was passed through a fixed bed stainless steel reactor (length: about 2 inches: diameter: about 0.5 inches, filled with a mixture of about 0.1-0.2 grams of a faujasite zeolite (either untreaded or treated in accordance with one of the methods described in Example II) and about 1.5 cc of 100/200 mesh quartz chips, at a time of contact between catalyst and of the hexane-nitrogen feed mixture of about 0.5-9 seconds. The reactor temperature was about 500° C. The product was analyzed by gas chromatography.

Pertinent parameters regarding the employed zeolites and the rate of conversion of n-hexane (in millimoles of hexane per gram catalyst per minute), are summarized in Table III.

chips. The gas oil feed had API gravity (at 60° F.) of 30.2, Ramsbottom carbon residue (ASTM D 524) of 0.23, sulfur content of 0.20 weight-%; nitrogen content of 0.08 weight-%, nickel content of 0.25 ppm (parts per million by weight), vanadium content of 9 ppm, molecular weight of 328, pour point of 100° F., viscosity at 210° F. of 39.3 SUS, an initial boiling point (ASTM D 1160) of about 550° F., and 90% of its volume boiling at about 550°-1010+ F. (at ASTM D 1160 condition). Pertinent test results are summarized in Table IV).

TABLE IV

| | Faujasite Zeolite | | | Measured | Product (Wt - %) | | | | | |
|---|---|---|---|---|---|---|---|---|---|---|
| Run | Surface Area (m²/g) | Unit Cell Size (A) | $(Si/Al)_c$ | Conversion (Wt - % of Feed) | Gasoline | Light Cycle Oil | Heavy Cycle Oil | $H_2$ | Other Gases | Coke |
| 7 | 770 | 24.56 | 5.3 | 34.7 | 21.4 | 27.4 | 37.9 | 0.012 | 8.4 | 4.9 |
| 8 | 733 | 24.50 | 7.2 | 47.0 | 31.5 | 24.8 | 28.2 | 0.012 | 10.1 | 5.3 |
| 9 | 702 | 24.48 | — | 51.2 | 36.0 | 24.1 | 24.7 | 0.002 | 11.0 | 4.3 |
| 10 | 733 | 24.47 | — | 52.6 | 40.4 | 28.0 | 19.4 | 0 | 8.3 | 4.0 |
| 11 | 741 | 24.42 | 8[1] | 56.1 | 43.6 | 26.9 | 17.0 | 0.002 | 9.2 | 3.3 |
| 12 | 700 | 24.41 | — | 60.2 | 46.2 | 26.2 | 13.6 | 0.007 | 9.1 | 4.9 |
| 13 | 745 | 24.40 | — | 58.4 | 43.7 | 25.8 | 17.7 | 0.004 | 9.7 | 5.0 |
| 14 | 728 | 24.38 | 17.5 | 60.9 | 46.8 | 25.9 | 13.2 | 0.002 | 10.2 | 3.9 |
| 15 | 719 | 24.37 | — | 65.7 | 49.3 | 23.5 | 10.8 | 0.003 | 11.4 | 4.9 |
| 16 | 742 | 24.36 | 21.2 | 61.8 | 47.0 | 26 0 | 12.2 | 0.003 | 10.7 | 4.0 |
| 17 | 777 | 24.35 | — | 66.9 | 50.4 | 23.2 | 9.9 | 0.008 | 11.4 | 5.1 |
| 18 | 782 | 24.32 | 21.2 | 59.5 | 44.1 | 24.7 | 15.8 | 0.002 | 10.8 | 4.6 |
| 19 | 797 | 24.25 | — | 40.8 | 30.6 | 29.2 | 30.0 | 0 | 6.2 | 4.0 |
| 20 | 633 | 24.25 | 100 | 25.6 | 18.2 | 31.2 | 43.2 | 0 | 3.3 | 4.1 |
| 21 | 790 | 24.20 | — | 16.7 | 11.7 | 32.5 | 50.8 | 0.005 | 2.1 | 2.9 |

[1]estimated from data in Table I.

TABLE III

| Run | Steam-Treated | Acid-Treated | Surface Area (m²/g) | Unit Cell Size (A) | $(Si/Al)_c$ | Rate of n-Hexane Conversion |
|---|---|---|---|---|---|---|
| 1 | No | No | 770 | 24.56 | 5.3 | 323 |
| 2 | No | Yes | 733 | 24.50 | 7.2 | 317 |
| 3 | Yes | Yes | 728 | 24.38 | 17.5 | 192 |
| 4 | Yes | Yes | 777 | 24.35 | — | 129 |
| 5 | Yes | Yes | 782 | 24.32 | 21.2 | 69 |
| 6 | Yes | Yes | 633 | 24.25 | 100 | 6 |

[1]micromoles of n-hexane converted per grams catalyst per minute.

Data in Table III clearly show that the hexane cracking activity of the zeolite cracking catalyst was highest for untreated LZ-Y82 (Run 1) and that dealumination signified by smaller unit cell size and higher Si:Al ratio in the crystalline zeolite framework, $(Si/Al)_c$, had a detrimental effect on the activity of the faujasite-type zeolite material for cracking n-hexane (a representative component of naphtha streams).

EXAMPLE IV

This example illustrates the cracking of a gas oil (provided by Phillips Petroleum Company, Bartlesville, OK under the designation KC Gas Oil J2543) in accordance with the microactivity test (MAT) procedure of ASTM D 3907-80 (reactor temperature; 900° F.; catalyst to oil weight ratio 3:1). The catalyst employed in the MAT tests was a mixture of 0.35 grams of one of the faujasite-type zeolites (untreated or partially dealuminated; See Example II) and about 4.65 gm of 100/200 mesh quartz Data in Table IV clearly show that, unexpectedly, gas oil conversion and gasoline yield were highest when the unit cell size of the faujasite cracking catalyst component was in the range of from about 24.28 to about 24.48 angstroms, more preferably from about 24.31 to about 24.42 angstroms (see also FIG. 1). The $(Si/Al)_c$ ratio in the crystalline zeolite portion for the more preferred unit cell size range of 24.31-24.42 A was about 8:1 to about 21:1.

The test data in Table IV also showed that the surface area of the faujasite-type zeolites employed was about 700-800 m²/g in all runs with the exception of run 20. Thus, the cracking results are essentially functions of the degree of dealumination of the zeolite, i.e., unit cell size and $(Si/Al)_c$. These cracking results for gas oil are especially surprising because data in Table III (Example III) did not indicate that partially dealuminated faujasites was more effective in cracking n-hexane than untreated faujasite.

EXAMPLE V

This example illustrates the cracking of a hydrotreated residuum that was obtained after hydrotreatment of an atmospheric resid in a commercial catalytic desulfurization unit of a Phillips Petroleum Company refinery. The hydrotreated resid had API[60] gravity of 22.7, Ramsbottom carbon residue of 3.1, sulfur content of 0.31 weight-%, nitrogen contant of 0.12 weight-%, 1.0 ppm nickel, 96 ppm vanadium and a viscosity at 210° F. of 14.3 SUS. Catalyst mixtures and MAT test conditions were essentially the same as those described in Example IV. Pertinent catalyst parameters and test results are summarized in Table V.

TABLE V

| | Faujasite Zeolite | | Measured | Product (Wt - %) | | | | | |
|---|---|---|---|---|---|---|---|---|---|
| Run | Surface Area (m²/g) | Unit Cell Size (A) | Conversion (Wt - % of Feed) | Gasoline | Light Cycle Oil | Heavy Cycle Oil | $H_2$ | Other Gases | Coke |
| 22 | 770 | 24.56 | 40.1 | 23.0 | 15.9 | 44.0 | 0.021 | 9.2 | 7.9 |

TABLE V-continued

| | Faujasite Zeolite | | Measured | Product (Wt - %) | | | | | |
|---|---|---|---|---|---|---|---|---|---|
| Run | Surface Area (m²/g) | Unit Cell Size (A) | Conversion (Wt - % of Feed) | Gasoline | Light Cycle Oil | Heavy Cycle Oil | $H_2$ | Other Gases | Coke |
| 23 | 729 | 24.50 | 40.8 | 24.2 | 15.7 | 43.6 | 0.018 | 10.0 | 6.6 |
| 24 | 680 | 24.46 | 54.3 | 36.4 | 16.4 | 29.3 | 0.016 | 11.1 | 6.6 |
| 25 | 674 | 24.39 | 62.9 | 43.6 | 12.6 | 24.6 | 0.022 | 12.8 | 6.0 |
| 26 | 651 | 24.38 | 60.6 | 43.0 | 18.8 | 20.6 | 0.024 | 12.0 | 5.5 |
| 27 | 777 | 24.35 | 63.0 | 43.8 | 17.8 | 19.2 | 0.016 | 12.4 | 6.6 |
| 28 | 633 | 24.25 | 34.6 | 24.1 | 18.7 | 46.8 | 0.011 | 5.6 | 4.8 |

Test data in Table V show the same trend as those of Table IV: conversion and gasoline yield conversion were higher for a unit cell size range of 24.46 A to about 24.3 A (midway between runs 27 and 28), thus at a $(Si/Al)_c$ range of about 8 to about 21. The graphic plot of conversion data in Tables IV and V showed that MAT conversion data for gas oil Table IV) and hydrotreated resid (Table V) are represented by essentially the same graph (see FIG. 1).

EXAMPLE VI

This example illustrates the effect of the sodium content on the gas oil cracking activity of a partially dealuminated LZ-Y82 faujasite having a $(Si/Al)_c$ ratio of about 20, prepared by steam-treatment of LZ-Y82 substantially in accordance with Method B of Example II. This partially dealuminated LZ-Y82 faujasite having a sodium content of less than 0.2 weight-% Na was then ion-exchanged by treatment with an aqueous NaCl solution (concentration, about 1 mole/l) so as to attain about 1.1 weight-% Na in the partially dealuminated zeolite material. MAT conversion and gasoline yield were measured in MAT tests using Kansas City gas oil (see Example IV) as feed. Pertinent test results are summarized in Table VI.

TABLE VI

| | Faujasite Zeolite | | Conversion | Product (Wt - %) | |
|---|---|---|---|---|---|
| Run | $(Si/Al)_c$ | Wt - % Na | (Wt - % of Feed) | Gasoline | Coke |
| 29 | ~10 | <0.2 | 61.5 | 45.7 | 3.8 |
| 30 | ~10 | 1.1 | 49.6 | 37.1 | 4.8 |

Data in Table VI clearly show that a higher sodium content in a partially dealuminated faujasite had detrimental effects on gas oil conversion, gasoline yeidl and coke formation. Thus, for higher gas oil cracking activity, the partially dealuminated faujasite should have an alkali metal content of less than about 0.5 weight-% alkali metal, more preferably less than about 0.2 weight-% alkali metal, in particular sodium.

I claim:

1. A cracking process comprising the step of contacting a hydrocarbon-containing feed stream having an initial boiling point, determined in accordance with ASTM D 1160, of at least about 400° F.
    with a catalyst composition comprising a zeolite selected from the group consisting of partially dealuminated natural faujasite, partially dealuminated natural mordenite, partially dealuminated synthetic faujasites and partially dealuminated synthetic mordenites,
    under such cracking conditions as to obtain at least one normally liquid hydrocarbon containing product stream having a lower initial boiling point and higher $API_{60}$ gravity than said hydrocarbon-containing feed stream;
    wherein said zeolite has a unit cell size, determined in accordance with ASTM D 3942-80, in the range of from about 24.31 to about 24.42 angstroms;
    said zeolite has an atomic ratio of Si to Al in the crystalline framework, determined by $^{29}Si$ solid state NMR spectroscopy, in the range of from about 8:1 to about 21:1;
    said zeolite has a surface area, determined by the $BET/N_2$ method, in the range of from about 500 to about 1,000 m²/g;
    and said zeolite contains less than about 0.2 weight percent alkali metal and is substantially free of iron ions.

2. A process in accordance with claim 1, wherein said hydrocarbon-containing feed stream has a boiling range of from about 400° F. to about 1200° F.

3. A process in accordance with claim 1, wherein said hydrocarbon-containing feed stream has $API_{60}$ gravity in the range of from about 5 to about 40.

4. A process in accordance with claim 1, wherein said hydrocarbon-containing feed stream has a boiling range of from about 500° F. to about 1110° F. and $API_{60}$ gravity in the range of from about 10 to about 35.

5. A process in accordance with claim 1, wherein said hydrocarbon-containing feed stream contains about 0.1-20 weight-% Ramsbottom carbon residue, about 0.1-5 weight-% sulfur, about 0.05-2.0 weight-% nitrogen, about 0.05-30 ppm nickel and about 0.1-50 ppm vanadium.

6. A process in accordance with claim 1, wherein said hydrocarbon-containing feed stream is selected from the group consisting of light gas oils, heavy gas oils, vacuum gas oils, cycle oils, topped crudes, hydrotreated topped crudes, hydrotreated residua, coal pyrolyrates liquid, products from extraction of coal, liquid products from liquifaction of coal liquid, products from extraction and pyrolysis of tar sands, and heavy fractions of shale oils.

7. A process in accordance with claim 6, wherein said group consists of heavy gas oils and hydrotreated residua.

8. A process in accordance with claim 1, wherein said alkali metal is sodium.

9. A process in accordance with claim 1, wherein said zeolite has a surface area in the range of from about 600 to about 800 m²/g.

10. A process in accordance with claim 1, wherein said zeolite has been partially dealuminated by a dealumination process comprising steam treatment.

11. A process in accordance with claim 10, wherein said steam treatment is carried out at about 1300°-1500° F. for about 0.5-5 hours.

12. A process in accordance with claim 10, wherein said dealumination process further comprise treatment with an aqueous acid solution after said steam treatment.

13. A process in accordance with claim 12, wherein said aqueous acid solution has a normality of from $10^{-3}$ to about 5 equivalents per liter.

14. A process in accordance with claim 12, wherein said treatment with an aqueous acid solution is carried out at about 180°–210° F. for about 1–10 hours.

15. A process in accordance with claim 1, wherein said catalyst composition further comprises at least one inorganic refractory material.

16. A process in accordance with claim 15, wherein said at least one inorganic refractory material is selected from the group consisting of silica, alumina, silica-alumina and clay.

17. A process in accordance with claim 15, wherein the weight ratio of said zeolite to said inorganic refractory material is in the range of from about 1:20 to about 1:1.

18. A process in accordance with claim 1, wherein said contacting is carried out in a fluidized bed catalyst cracking reactor.

19. A process in accordance with claim 18, wherein said contacting is carried out in the presence of steam.

20. A process in accordance with claim 1, wherein said at least one normally liquid hydrocarbon-containing product stream is a gasoline stream.

21. A process in accordance with claim 1, wherein said zeolite is a partially dealuminated Y-zeolite.

* * * * *